US007861308B2

(12) United States Patent
Strohwig et al.

(10) Patent No.: US 7,861,308 B2
(45) Date of Patent: Dec. 28, 2010

(54) DIGITAL RIGHTS MANAGEMENT USING TRUSTED TIME

(75) Inventors: Marc E. Strohwig, Walnut Creek, CA (US); Yoji Kawamoto, Tokyo (JP); Motohiko Nagano, Tokyo (JP); Pierre Chavanne, Davis, CA (US); Norifumi Goto, Tokyo (JP); Oscar H. Steele, III, Sunnyvale, CA (US); Eric John Swenson, Soquel, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1430 days.

(21) Appl. No.: 11/289,099

(22) Filed: Nov. 28, 2005

(65) Prior Publication Data

US 2007/0124819 A1 May 31, 2007

(51) Int. Cl.
*G06F 7/04* (2006.01)
(52) U.S. Cl. .......................................... 726/26; 713/178
(58) Field of Classification Search ............. 726/26–33, 726/2–4, 1; 713/178, 194; 705/902, 911, 705/51, 54, 57, 59
See application file for complete search history.

(56) References Cited

U.S. PATENT DOCUMENTS

| 5,892,900 | A | 4/1999 | Ginter et al. | |
|---|---|---|---|---|
| 6,728,880 | B1 * | 4/2004 | Sites | 713/178 |
| 2002/0019814 | A1 * | 2/2002 | Ganesan | 705/59 |
| 2002/0038231 | A1 * | 3/2002 | Hasebe et al. | 705/8 |
| 2002/0048369 | A1 * | 4/2002 | Ginter et al. | 380/277 |
| 2002/0048396 | A1 * | 4/2002 | Bewley et al. | 382/154 |
| 2002/0056042 | A1 * | 5/2002 | van der Kaay et al. | 713/178 |
| 2002/0169974 | A1 * | 11/2002 | McKune | 713/200 |
| 2002/0183864 | A1 * | 12/2002 | Apel et al. | 700/14 |
| 2003/0063750 | A1 * | 4/2003 | Medvinsky et al. | 380/277 |
| 2003/0204738 | A1 * | 10/2003 | Morgan | 713/194 |
| 2003/0233553 | A1 * | 12/2003 | Parks et al. | 713/178 |
| 2005/0091312 | A1 * | 4/2005 | Kuriya | 709/203 |
| 2005/0133582 | A1 | 6/2005 | Bajikar | |
| 2005/0138357 | A1 * | 6/2005 | Swenson et al. | 713/155 |
| 2005/0204209 | A1 * | 9/2005 | Vataja | 714/701 |
| 2005/0278716 | A1 * | 12/2005 | Koppen et al. | 717/168 |
| 2006/0107042 | A1 * | 5/2006 | Kohmoto | 713/158 |
| 2006/0248596 | A1 * | 11/2006 | Jain et al. | 726/27 |
| 2006/0294593 | A1 * | 12/2006 | Eldar et al. | 726/26 |

OTHER PUBLICATIONS

Notice of Allowance from U.S. Appl. No. 10/957,109 mailed May 24, 2009.

* cited by examiner

*Primary Examiner*—Matthew B Smithers
*Assistant Examiner*—Abu Sholeman
(74) *Attorney, Agent, or Firm*—Fitch, Even, Tabin & Flannery

(57) ABSTRACT

A method for monitoring time so that the use of protected content can be controlled includes receiving a trusted time value from a trusted authority external to a client device. When the client is no longer in communication with the trusted authority, the previously-received trusted time value is updated by use of the client's operating system counter so that a calculated trusted time value is derived for content license evaluation purposes.

21 Claims, 9 Drawing Sheets

DIGITAL RIGHTS MANAGEMENT USING TRUSTED TIME

FIELD OF INVENTION

This relates to digital rights management for the protection of content. More specifically, this relates to digital rights management using trusted time received from trusted authorities.

BACKGROUND

Providers of digital video content, audio content, and computer applications, etc. often are reluctant to deliver these items over the Internet or otherwise without effective protection. While the technology exists for providers to deliver content over the Internet, digital content by its very nature is easy to duplicate either with or without the owner's authorization. The Internet allows the delivery of the content from the owner, but that same technology also permits widespread distribution of unauthorized, duplicated content.

Digital Rights Management (DRM) is a digital content protection model that has grown in use in recent years as a means for protecting file distribution. DRM usually encompasses a complex set of technologies and business models to protect digital media, computer applications or other data (all of which is generally referred to herein as "content") and to provide revenue to content owners.

Many known DRM systems use a storage device, such as a hard disk drive component of a computer, that contains a collection of unencrypted content provided by content owners. The content in the storage device resides within a trusted area behind a firewall. Within the trusted area, the content residing on the storage device can be encrypted. A content server receives encrypted content from the storage device and packages the encrypted content for distribution. A license server holds a description of rights and usage rules associated with the encrypted content, as well as associated encryption keys. (The content server and license server are sometimes part of a content provider system that is owned or controlled by a content provider (such as a studio) or by a service provider.) A playback device or client receives the encrypted content from the content server for display or other use and receives a license specifying access rights from the license server.

Some DRM processes consist of requesting an item of content, encrypting the item with a content key, storing the content key in a content digital license, distributing the encrypted content to a playback device, delivering a digital license file that includes the content key to the playback device, and decrypting the content file and playing it under the usage rules specified in the digital license.

Some digital licenses include time-based rules that control, for example, the expiration date of a license, or the length of time that content may continue to be used by a client device after an initial use of that content. To check such rules, a client or other device must use a clock. However, client system clocks frequently are subject to tampering, thereby making it possible in some circumstances to circumvent time-based rules. Accordingly, improved methods and systems of protection are desirable to accomplish delivery of protected content that is governed by licenses having temporal requirements.

SUMMARY OF THE ILLUSTRATED EMBODIMENTS

Embodiments of the invention include methods and systems for monitoring time so that the use of protected content can be controlled. Rather than relying only upon a client's system clock, which may be susceptible to tampering by a user, embodiments of the invention use a correct, "trusted" time value that is received from a trusted authority external to the client device. When the client is no longer in communication with the trusted authority, the previously-received, trusted time value is updated by use of the client's operating system counter so that a calculated, updated trusted time value is derived for content license evaluation purposes.

In one aspect, a first time value is obtained from the trusted authority external to the client while the trusted authority is in communication with the client via a network. The first time value is securely stored. A first counter value corresponding to a point in time corresponding to the first time value is also securely stored. When the client is not in communication with the trusted authority, a time offset value is combined with the first time value to obtain a calculated time value. The time offset value is a function of the difference between a second counter value and the first counter value. A content license having temporal rules is evaluated according to the calculated time value.

In another aspect, the first and second counter values are generated by a counter that is adapted to provide a plurality of counter values between a minimum counter value and a maximum counter value. This counter "rolls over" so that the minimum counter value is generated following the maximum counter value. The time offset value is a function of the second counter value minus the first counter value if the first counter value is less than the second counter value. On the other hand, if the first counter value is greater than the second counter value, the time offset value is a function of the second counter value plus the maximum counter value minus the first counter value.

In an alternative embodiment, a first calculated time value corresponding to a point in time when content is used by a client on a first occasion is calculated. The first calculated time value is a function of a first trusted time value received by a client from a trusted authority external to the client during a first communication session.

A first time offset value corresponding to a difference between a second trusted time value and a second calculated time value is calculated. The second trusted time value is received by the client from the trusted authority during a second communication session. The second calculated time value corresponds to a point in time when the second trusted time value is received by the client, and is a function of the first trusted time value.

An elapsed time value corresponding to a difference between a third calculated time value and a revised first calculated time value is calculated. The third calculated time value corresponds to a point in time when the client attempts use of the content for a second occasion and is a function of the second trusted time value. The revised first calculated time value corresponds to a combination of the first calculated time value and the first time offset value. A content license having temporal rules is evaluated according to the elapsed time value.

There are additional aspects to the present inventions. It should therefore be understood that the preceding is merely a brief summary of some embodiments and aspects of the present inventions. Additional embodiments and aspects of the present inventions are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of embodiments of the present invention will become apparent and more readily appreciated from the following description, taken in conjunction with the accompanying drawings of which.

DETAILED DESCRIPTION

Figure 1:
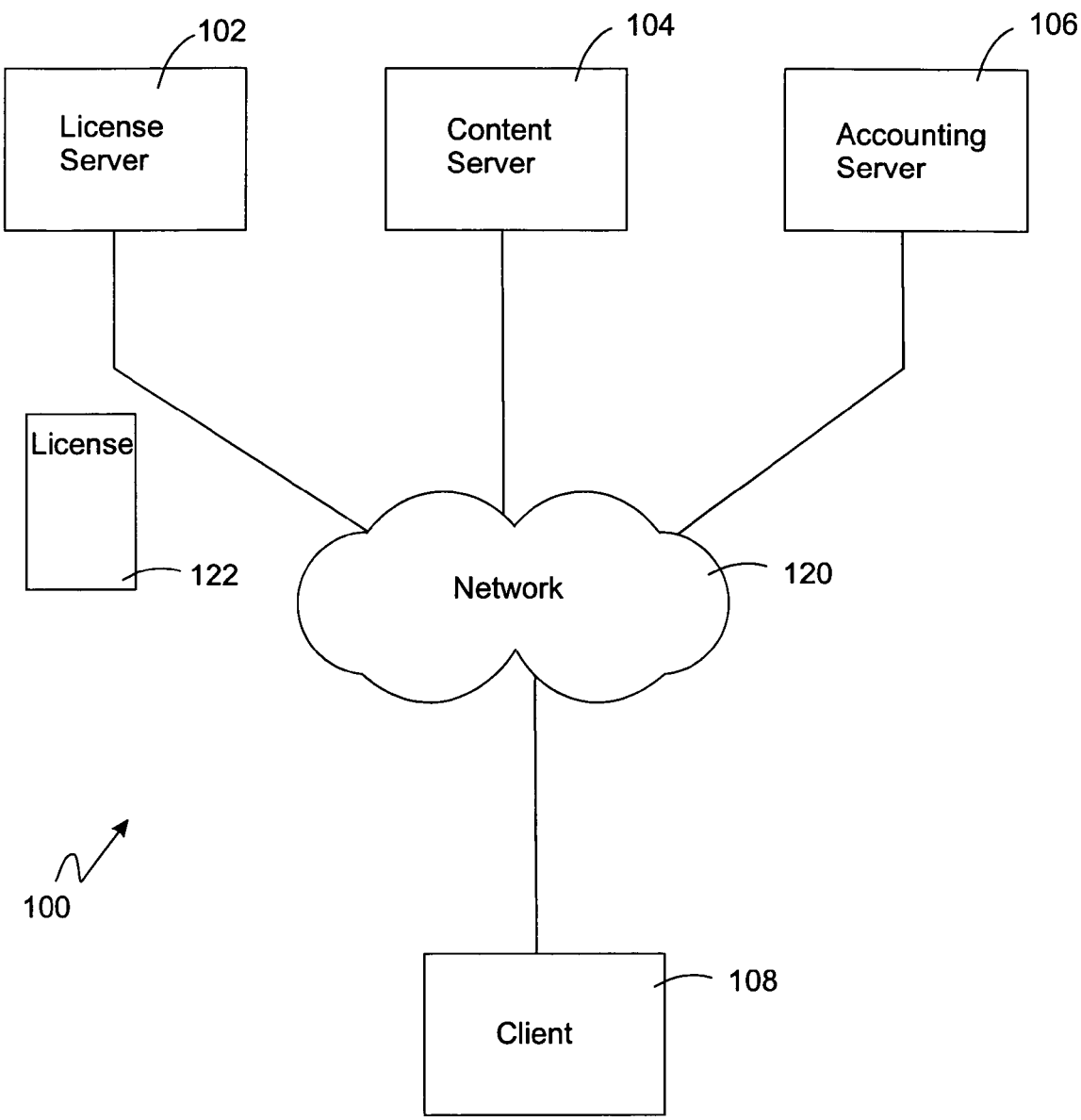
FIG. 1 is a simplified block diagram of an exemplary configuration of a content providing system to which aspects of the present invention may be applied.

Reference will now be made in detail to embodiments of the present invention, examples of which are illustrated in the accompanying drawings, wherein like reference numerals refer to like elements throughout. It is understood that other embodiments may be utilized and structural and operational changes may be made without departing from the scope of the present invention.

Embodiments of the present invention include methods and systems for monitoring time so that the use of protected content can be controlled. Rather than relying only upon a client's system clock, which may be susceptible to tampering by a user, a client device receives a trusted time value from a trusted authority external to the client. When the client is no longer in communication with the trusted authority, the previously-received trusted time value is updated by use of the client's operating system counter so that a calculated, updated trusted time value is derived for content license evaluation purposes.

According to one embodiment, the client securely stores a trusted time value received from a trusted authority in one or more tamper-resistant, secure stores. Also securely stored is a system counter value that corresponds to the point in time associated with the trusted time value. When the client is no longer in communication with the trusted authority, a calculated, updated trusted time value is generated by combining a time offset value (that is a function of a difference between a current system counter value and the stored system counter value) with the stored, trusted time value. The calculated trusted time value is then used for license evaluation. Although this calculated trusted time value can be generated at a point in time when the client is no longer in communication with the trusted authority, this time value nevertheless represents an updated point in time that is resistant to user tampering yet suitable for content license evaluation.

Referring to FIG. 1, there is shown an exemplary configuration of a content providing system 100 to which embodiments of the present invention may be applied. The content providing system 100 handles protected content which can include video data, audio data, image data, text data, computer applications, etc. A license server 102, a content server 104, and an accounting server 106 are each connected to a client 108 and to each other via a network 120 which is the Internet for example. In this example, only one client 108 is shown, but those skilled in the art will appreciate that any number of clients may be connected to the network 120.

The content server 104 provides content to the client 108. The license server 102 grants a license 122 necessary for the use by the client 108 of the content. The accounting server 106 is used to bill the client 108 when it is granted the license 122. While the illustrated embodiment shows three servers in communication with the client 108, it will be understood that all of these server functions could be included in a fewer or greater number of servers than the three which are shown here.

Figure 2:
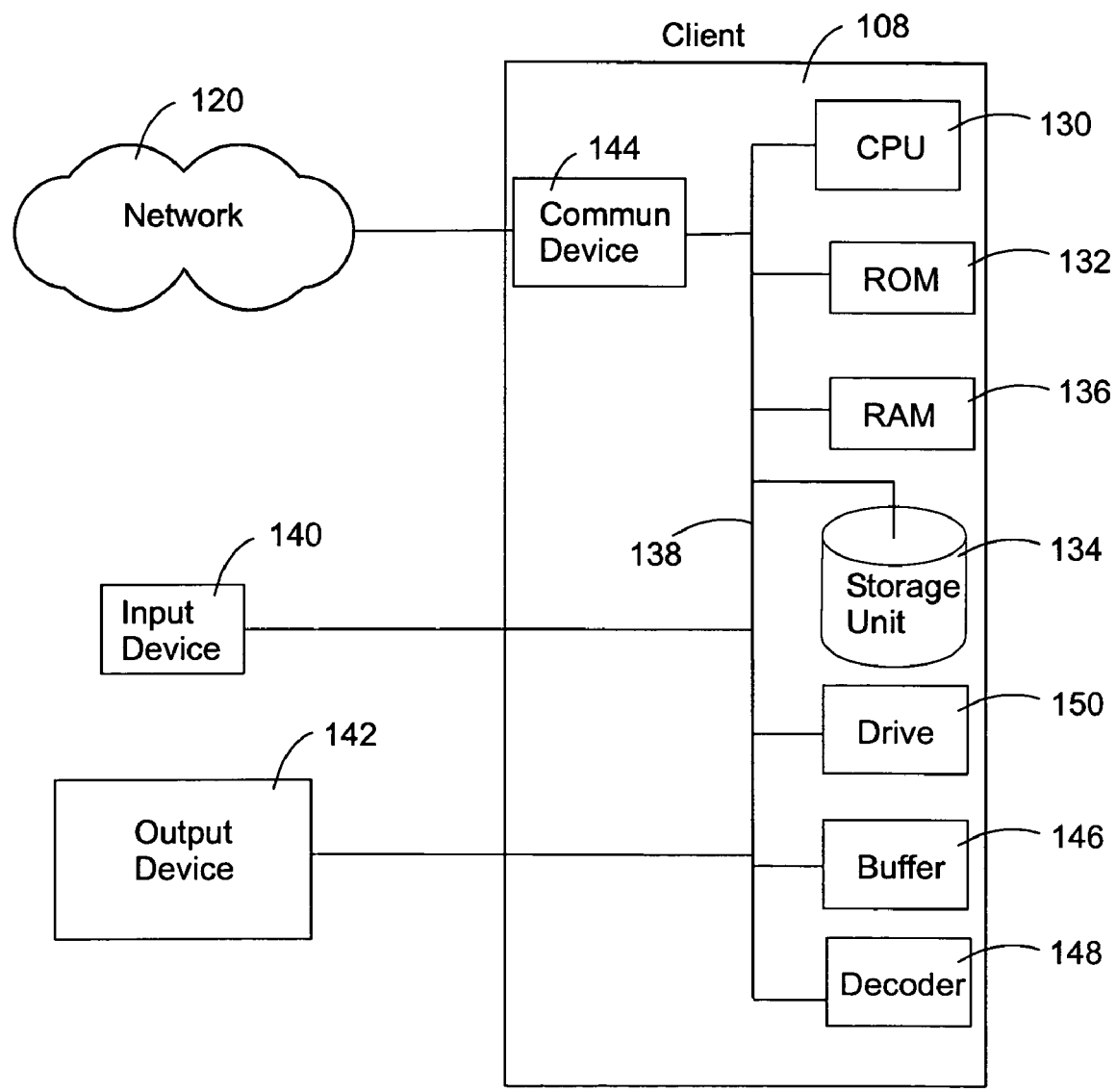
FIG. 2 is a simplified block diagram of the client device of FIG. 1.

FIG. 2 illustrates an exemplary configuration of the client 108. Referring to FIG. 2, a central processing unit (CPU) 130 executes a variety of processing operations as directed by programs stored in a read only memory (ROM) 132 or loaded from a storage unit 134 into a random access memory (RAM) 136. The RAM 136 also stores data and so on necessary for the CPU 130 to execute a variety of processing operations as required.

The CPU 130, the ROM 132, and the RAM 136 are interconnected via a bus 138. The bus 138 further connects an input device 140 composed of a keyboard and a mouse for example, an output device 142 composed of a display unit based on CRT or LCD and a speaker for example, the storage unit 134 based on a hard disk drive for example, and a communication device 144 based on a modem, network interface card (NIC) or other terminal adaptor for example.

The ROM 132, RAM 136 and/or the storage unit 134 stores operating software used to enable operation of the client 108. A buffer 146 receives and buffers sequential portions of streaming encrypted content from the content server 104 (FIG. 1) via the network 120 while using an associated decryption key (not shown) needed to decrypt the encrypted content. The encrypted content and the associated decryption key are sent to a decoder 148. The decoder 148 decrypts and decodes the content using the decryption key associated with the content.

The communication device 144 executes communication processing via the network 120, sends data supplied from the CPU 130, and outputs data received from the network 120 to the CPU 130, the RAM 136, and the storage unit 134. The storage unit 134 transfers information with the CPU 130 to store and delete information. The communication device also communicates analog signals or digital signals with other clients.

The bus 138 is also connected with a drive 150 as required on which a magnetic disk, an optical disk, a magneto-optical disk, or a semiconductor memory for example is loaded for computer programs or other data read from any of these recording media being installed into the storage unit 134.

Although not shown, the content server 104, the license server 102, and the accounting server 106 (FIG. 1) are also each configured as a computer which has basically the same configuration as that of the client 108 shown in FIG. 2. While FIG. 2 shows one configuration of the client 108, alternative embodiments include a set top box, a personal computer, a portable playback device, or any other type of a computer device.

In the content providing system 100, the license and content servers 102, 104 send the license 122 and the content to the client 108. (FIG. 1) The license 122 is required to enable the client 108 to use (i.e., render, reproduce, copy, execute, etc.) the protected content which frequently is in encrypted form.

Each item of content is configured and encrypted by a service provider organization using one or more encryption keys. The client 108 decrypts and reproduces the received item of content on the basis of the license information and the content. In some embodiments, the license information includes usage rights, such as for example, the expiration date beyond which the item of content may not be used, the number of times that the content may be used, the number of times that the content can be copied to a recording medium such as a CD for example, the number of times that the content may be checked out to a portable device, the length of time that content may be used after an initial use, etc.

As previously mentioned, embodiments of the invention involve a client that receives a trusted time value from a trusted authority external to the client. The trusted authority may be any entity, such as for example, a server in communication with the client via a network such as the Internet, a WAN, a LAN, etc. The trusted authority maintains trusted time according to any one of a number of available time conventions. When the client is no longer in communication with the trusted authority, the previously-received trusted time value is updated by use of the client's operating system counter so that a calculated trusted time value is derived for the evaluation of content licenses having temporal based rules.

After the trusted time value is received from the trusted authority, the client securely stores this value in one or more secure, tamper-resistant stores. Also securely stored is a system counter value that corresponds to the point in time associated with the trusted time value. The system counter value is obtained from the client's operating system counter which is adapted to provide a plurality of counter values between a minimum counter value and a maximum counter value. For example, in an operating system counter having a 32 bit resolution, the maximum counter value is 0xFFFFFFFF. Once this maximum value is reached, the counter "rolls over" so that the minimum counter value is generated following the maximum value.

These stored counter and time values are used to derive the calculated trusted time value. To generate this value, a time offset value is combined with the stored, trusted time value. This time offset value is a function of the difference between a current system counter value and the previously-stored system counter value. Although this calculated trusted time value can be generated at points in time when the client is no longer in communication with the trusted authority, this time value nevertheless represents an updated, current point in time that is resistant to user tampering and suitable for content license evaluation.

Figure 3:
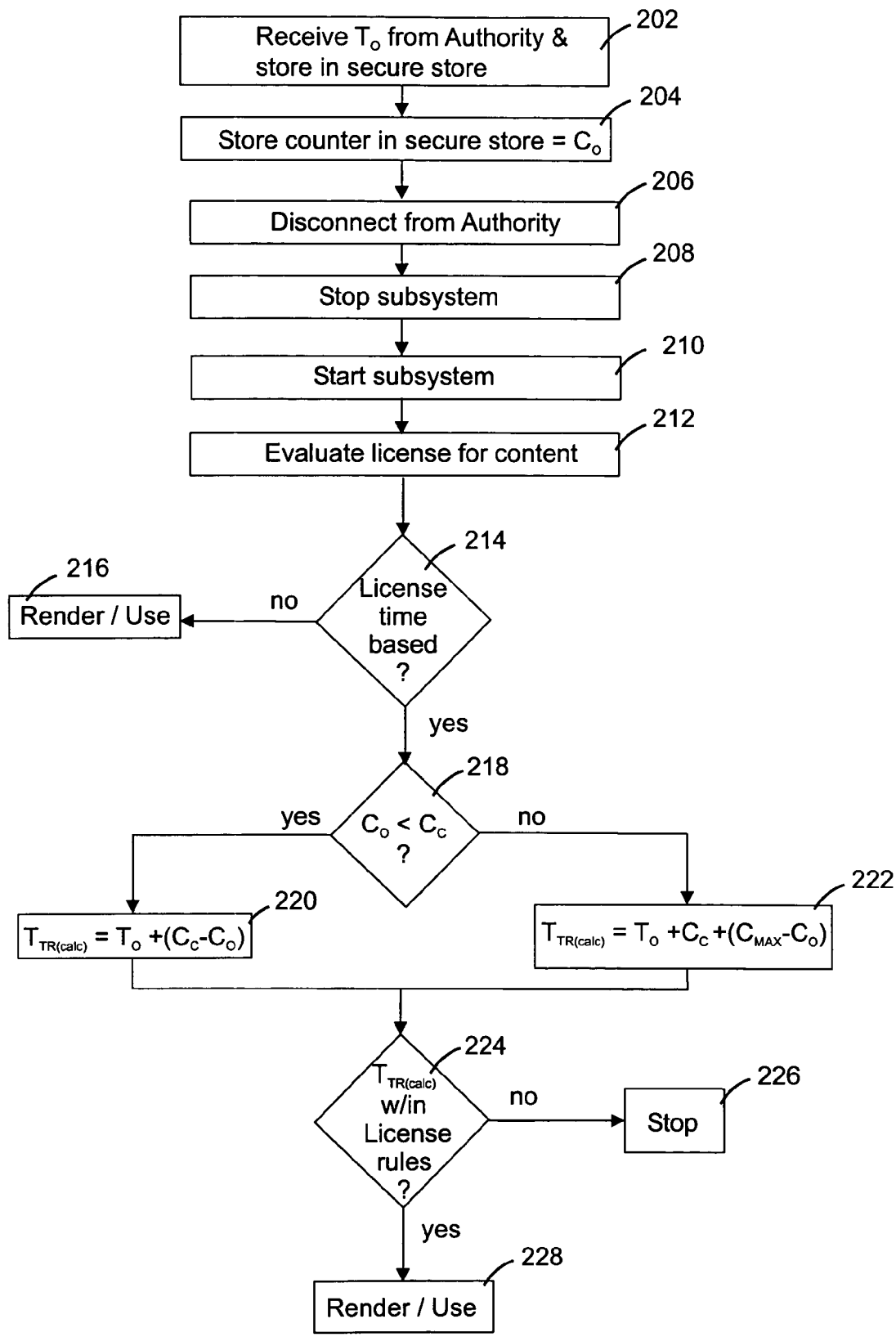
FIG. 3 is a simplified flow diagram of a process for monitoring time according to one embodiment of the invention.

FIG. 3 depicts a simplified flow diagram of a process for monitoring time by calculating this trusted time value ($T_{TR(calc)}$) when a client device is not in communication with a trusted authority. In step 202, the client initially is in communication with a trusted authority and receives a verified, trusted time value from the trusted authority. Using a DRM subsystem portion of an application that is adapted to use protected content, the client securely stores this verified trusted time value ($T_O$) in one or more secure stores. From the client's operating system, the client also retrieves a reference system counter value ($C_O$) that corresponds to a point in time corresponding to $T_O$, and securely stores $C_O$ in the same or another secure store. Step 204. At some later point in time, the client disconnects from or is otherwise no longer in communication with the trusted authority. Step 206. The DRM subsystem is then shut down (step 208), and at a later point in time, restarted. Step 210.

Next the DRM subsystem evaluates a content license (step 212), and determines whether the license is time-based. Step 214. If the license is not time-based, the application will proceed to render or otherwise use the content. Step 216. If on the other hand, the content license is time-based, a determination is made whether the stored, reference counter value ($C_O$) is less than an operating system current counter value ($C_C$) corresponding generally to the present point in time. Step 218. As discussed below, this determination is necessary in order to establish whether or not the operating system counter has rolled over since the point in time when $C_O$ was obtained from the trusted authority.

If the stored reference counter value ($C_O$) is less than the current counter value ($C_C$), then according to step 220, a time offset value that is a function of the difference between the two counter values ($C_C$–$C_O$) is combined with $T_O$ obtain a calculated trusted time value according to the following algorithm:

$$T_{TR(calc)}=T_O+(C_C-C_O),$$

where $T_{TR(calc)}$ is the calculated trusted time, $T_O$ is the verified, stored trusted time, $C_C$ is the current counter value, and $C_O$ is the stored reference counter value. For convenience in annotation only, the time offset value is denoted here and throughout the remainder of this specification as a difference in counter values (e.g. –($C_C$–$C_O$)), rather than as a function of their difference; it being understood that to obtain a time value from a system counter value, a functional relationship must be applied, such as for example, by multiplying the counter differential value by a constant factor.

Still referring to FIG. 3, if the stored counter value, $C_O$, is not less than the current counter value, $C_C$, then according to step 222 the following algorithm is used to derive the calculated trusted time:

$$T_{TR(calc)}=T_O+C_C+(C_{MAX}-C_O),$$

where $T_{TR(calc)}$ is the calculated trusted time, $T_O$ is the verified, stored trusted time, $C_C$ is the current counter value, $C_O$ is the stored reference counter value, and $C_{MAX}$ is the maximum counter value for a counter before it rolls over to zero or other minimum counter value.

After the calculated trusted time value, $T_{TR(calc)}$, is obtained in accordance with either of the steps 220 or 222, a determination is made whether the calculated trusted time value is within the rules of the content license. Step 224. If the calculated trusted time value is not within license rules, then the application will not render or otherwise use the content. Step 226. If on the other hand, the calculated trusted time value is within the license rules, then the content can be rendered or otherwise used. Step 228. It should be noted however that the embodiments of FIG. 3 apply when the client remains powered on for those operating systems in which the counter returns to zero when the client shuts down.

In an alternative embodiment of the invention, the status of synchronized trusted time in one client device can be transmitted to another client device. This process involves the use of values pertaining to a "last trusted connection time" (LTC) and a "session start time" (SST). LTC corresponds to a date-time value when the client device was last connected to (and in communication with) a trusted time authority. SST corresponds to a date-time value when a component, module or other subsystem was most recently initialized, where the component, module or other subsystem is part of an application that incorporates DRM features and is adapted to use content.

This embodiment is for use with licenses having a requirement that a client has been in communication within a given time frame with a trusted time authority (and presumably obtain an updated trusted time value from that trusted authority) while the DRM component, module or other subsystem of the application is running and able to obtain, secure or otherwise use the trusted time. On the other hand, if the DRM subsystem was initialized at a point in time after the most recent connection or communication time with the trusted authority, then the use or rendering of protected content is not permitted, since there is an increased risk of system clock tampering or other time-related tampering while the DRM subsystem is shut down and unable to detect or protect against such tampering.

Figure 4:
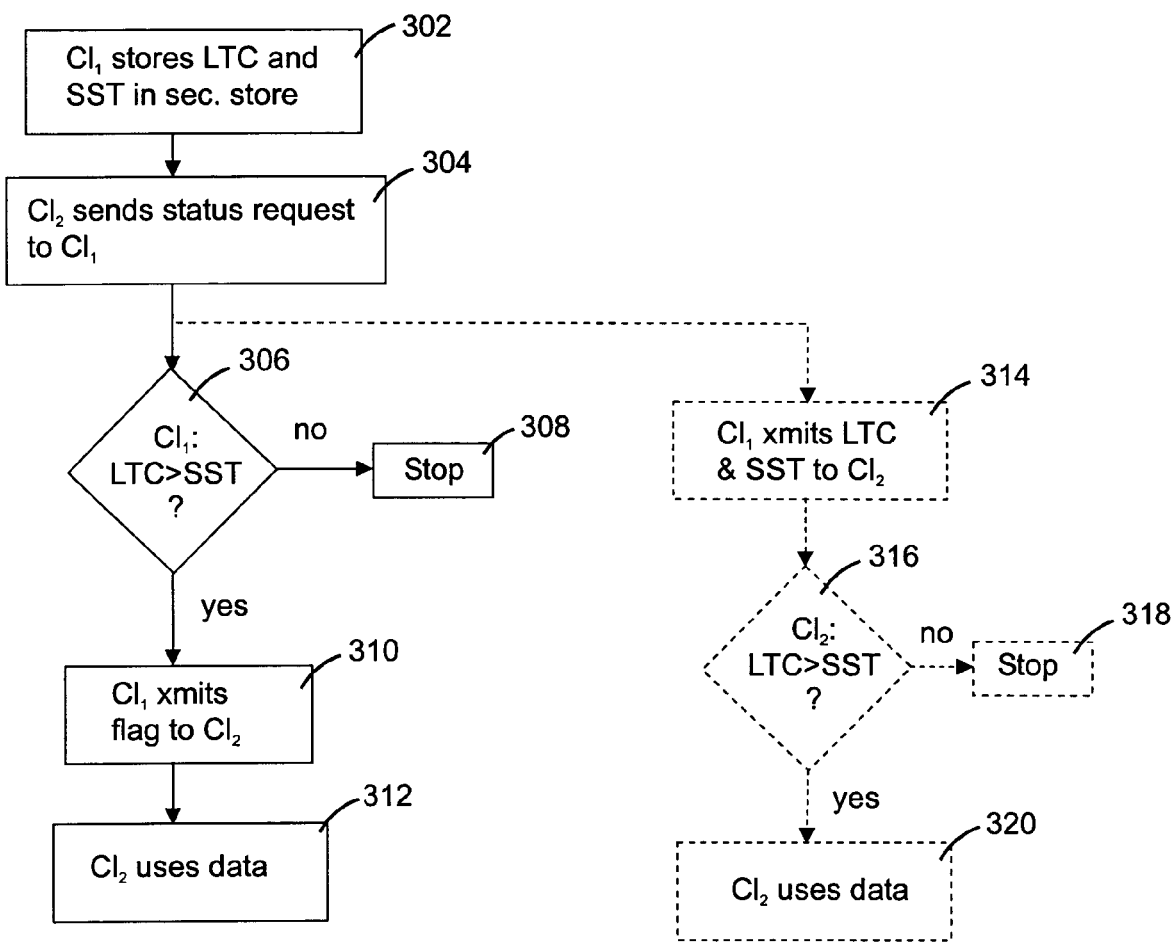
FIG. 4 is a simplified flow diagram of a process wherein the status of synchronized trusted time in one client device can be transmitted to another client device in accordance with another embodiment of the invention.

FIG. 4 is a simplified process flow diagram wherein this status of the synchronized trusted time in one client device can be transmitted to the other client device. In step 302, a first client ($Cl_1$) device securely stores both of the LTC and SST values in one or more secure stores. At some later point in time, a second client ($Cl_2$) device sends a status request to the first client. Step 304. In response, the first client makes a determination whether LTC is greater than SST, i.e., whether or not there has been a connection and communication with the trusted authority more recently in time than the initialization of a session of at least a subsystem of the application. Step 306. If not, then the process stops and the first client will not respond to the status request. Step 308. Because LTC is not greater than SST, this indicates that the subsystem session was initialized at some point in time after the first client had synchronized with the trusted authority and after the client had obtained a verified, trusted time value, $T_O$, from the trusted authority.

On the other hand if LTC is greater than SST, then this indicates that the first client has communicated with the trusted authority and obtained an updated trusted time value, $T_O$, while the DRM subsystem portion of the application has been up and running. In step 310 therefore, the first client transmits a flag to the second client indicating that the first client has an updated, verified trusted time value that is more recent than the application session start time. Upon receipt of the flag, the second client is then allowed to use the content data assuming other licensing conditions are met. Step 312.

FIG. 4 also shows an alternative process that can proceed after the second client has sent the status request to the first client as shown in step 304. Alternatively, upon receipt of the status request, the first client transmits the LTC and SST values to the second client. Step 314. Next, it is the second client that evaluates whether LTC is greater than SST. Step 316. If it is not, then the process stops and no content is rendered or used. Step 318. On the other hand, if LTC is greater than SST, then the second client can render or otherwise use the data assuming other licensing conditions are met. Step 320.

In an alternative embodiment of the invention, a client may be required by license rules to have communicated with a trusted authority while at least a DRM subsystem of an application is up and running before a calculated trusted time value may be used for content license evaluation purposes. In other words, a synchronization between the DRM subsystem and the trusted authority is required at some point in time. This synchronization reduces the danger of system clock tampering or other time-related tampering while the DRM subsystem is shut down and unable to detect or protect against such tampering. When later calculations are required to generate a calculated trusted time value after communications with the trusted authority have been severed, then the resulting calculated trusted time value is more likely to be accurate. The underlying system counter value and trusted time value which are used in deriving the calculated trusted time value are less likely to have been altered or tampered with under these circumstances.

Figure 5:
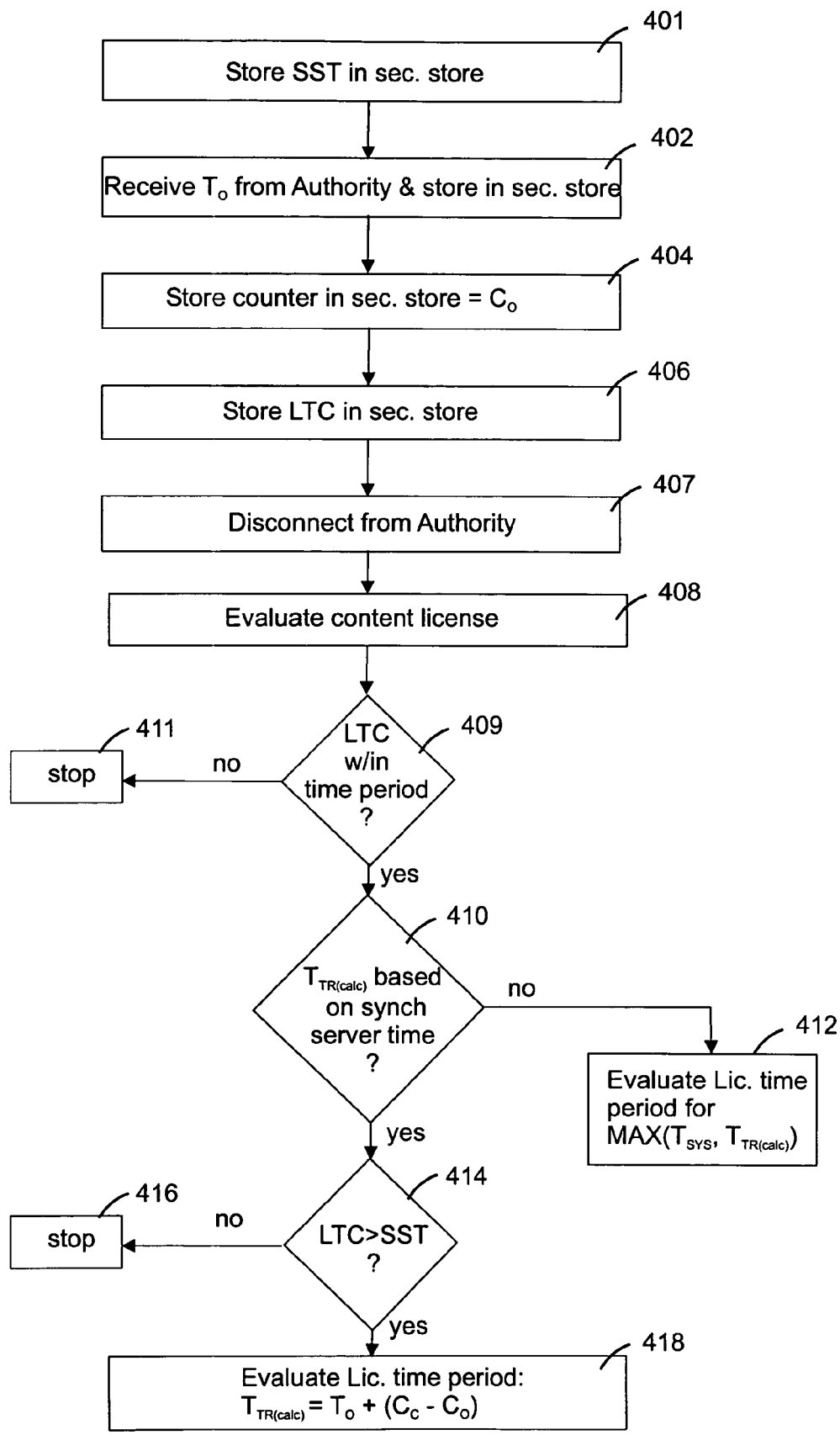
FIG. 5 is a simplified flow diagram of another process for monitoring time according to another embodiment of the invention.

FIG. 5 is a simplified process flow diagram for this alternative embodiment. In step 401, an application that renders or uses content is started (or at least a subsystem of the application is initialized) and a corresponding session start time (SST) is securely stored in one or more secure stores. When in communication with a trusted authority, the client receives a verified trusted time value ($T_O$) from the trusted authority and securely stores this value in the same or another secure store. Step 402. Additionally, the client securely stores an updated system counter value ($C_O$) corresponding to a point in time corresponding to the trusted time value, and further securely stores an LTC value. Steps 404 and 406. At a later point in time, the client disconnects from or is otherwise no longer in communication with the trusted authority. Step 407.

The application evaluates the license (step 408) and a determination is made whether the LTC corresponds to a point in time that has occurred within a predetermined time period, such as for example, within the past 20 minutes. Step 409. If LTC has not occurred within this time period, then the process terminates and use of the content will not be permitted. Step 411. On the other hand, if LTC has occurred within the time period, then a determination is made whether the license requires that trusted time calculations be based on synchronized trusted authority time. Step 410. If this is not required, then the larger of one of two values is selected for license evaluation. The values are the current system clock time value ($T_{SYS}$) or the current, calculated trusted time value ($T_{TR(calc)}$) that is calculated in accordance with the previously-described algorithm, $T_{TR(calc)} = T_O + (C_C - C_O)$, or according to the algorithm $T_{TR(calc)} = T_O + C_C + (C_{MAX} - C_O)$, when $C_C$ is less than $C_O$. Step 412. MAX($T_{SYS}$, $T_{TR(calc)}$), i.e., the larger of $T_{SYS}$ and $T_{TR(calc)}$, is used to evaluate against the license time requirements, and thus provides some DRM protection against system clock roll back by a user. If a user rolled back the system clock, then $T_{TR(calc)}$ likely will be the larger value and will be used for license evaluation. On the other hand, if system time tampering resulted in a $T_{SYS}$ value greater that $T_{TR(calc)}$, then this likely would work against the user (and in favor of the content provider) since $T_{SYS}$ would be used to evaluate the license and may result in a premature termination of license usage rights.

If on the other hand, the content license requires that trusted time calculations be based on synchronized trusted authority time, then a determination is made whether LTC is greater than SST. Step 414. If it is not, then the process terminates and use of the content will not be permitted, since a synchronization had not occurred prior to the loss of communication with the trusted authority. Step 416. On the other hand, if LTC is greater than SST, then the license time period is evaluated according to a calculated trusted time value that is calculated according to the previously-described algorithm, $T_{TR(calc)} = T_O + (C_C - C_O)$, or according to the algorithm $T_{TR(calc)} = T_O + C_C + (C_{MAX} - C_O)$, when $C_c$ is less than $C_O$. Step 418.

According to yet another embodiment of the invention, content licensing is controlled in situations where a license allows content use for a certain number of hours or other time period after the content is first used by a client. For example, where the content is music and its license permits a playback period of 72 hours, then the 72 hour time period would commence running when the music is first played by the client. This embodiment of the invention permits the monitoring of the allowed time period when the client is no longer in communication with a trusted authority.

According to this embodiment, a calculated trusted time, i.e., a "marker" time, is generated when the content is used on a first occasion. When communications are re-established with a trusted authority and a new, updated trusted time is received from the trusted authority, an offset time value is calculated. This offset time value is a time differential value between the new, updated trusted time received from the trusted authority and a second, calculated trusted time value that is calculated as of the same point in time as the updated trusted time. In other words, the time as calculated as a function of the system counter is compared with the newly-received, trusted time, and the difference, or time offset value, is securely stored. This time offset value is applied to the original "marker" time to adjust the start time so that a more accurate, yet tamper resistant, calculation of the elapsed time period can be made for license evaluation purposes.

Figure 6A:
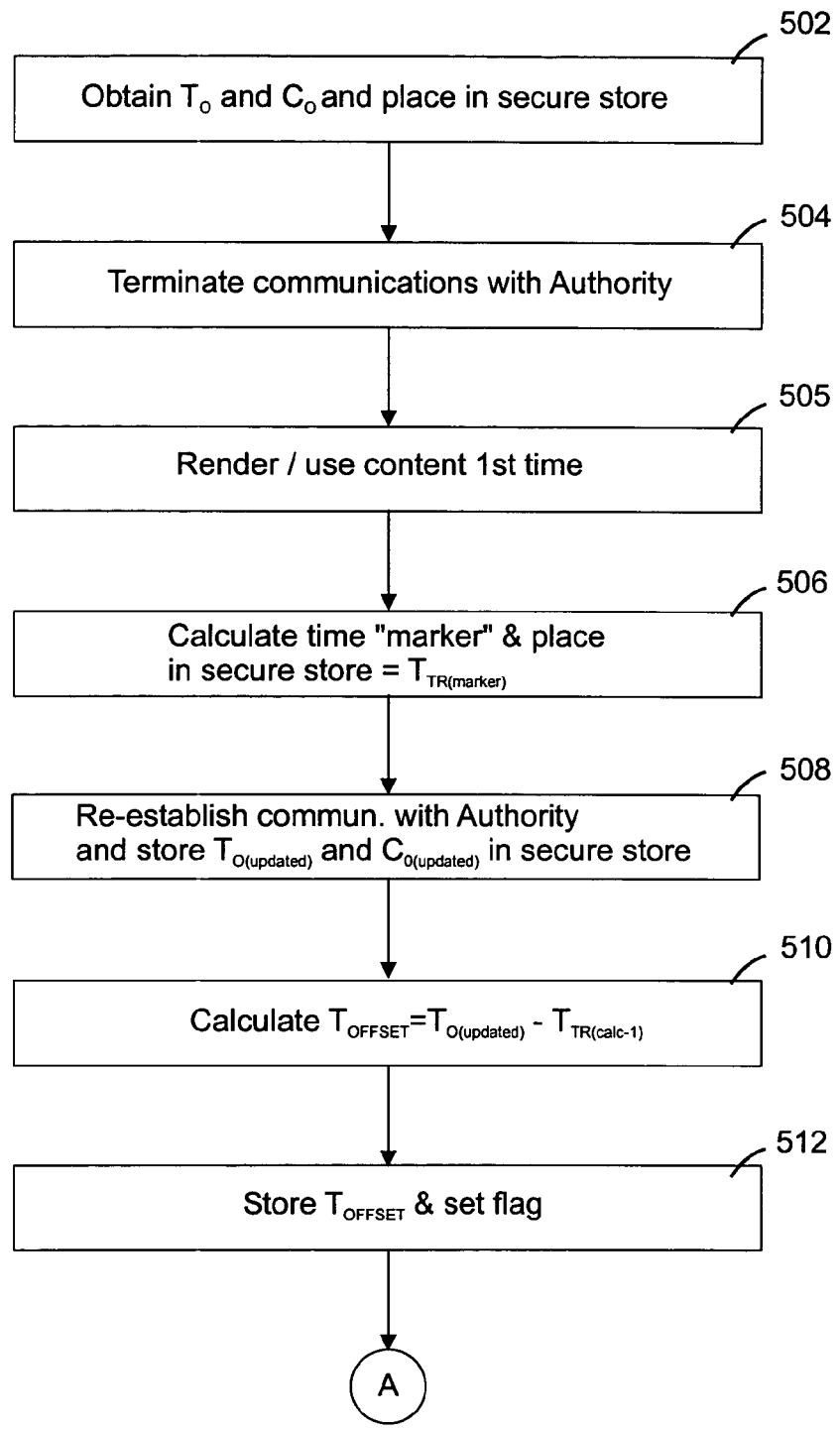
FIGS. 6a and 6b are a simplified flow diagram of yet another process for monitoring time according to another embodiment of the invention.
Figure 6B:
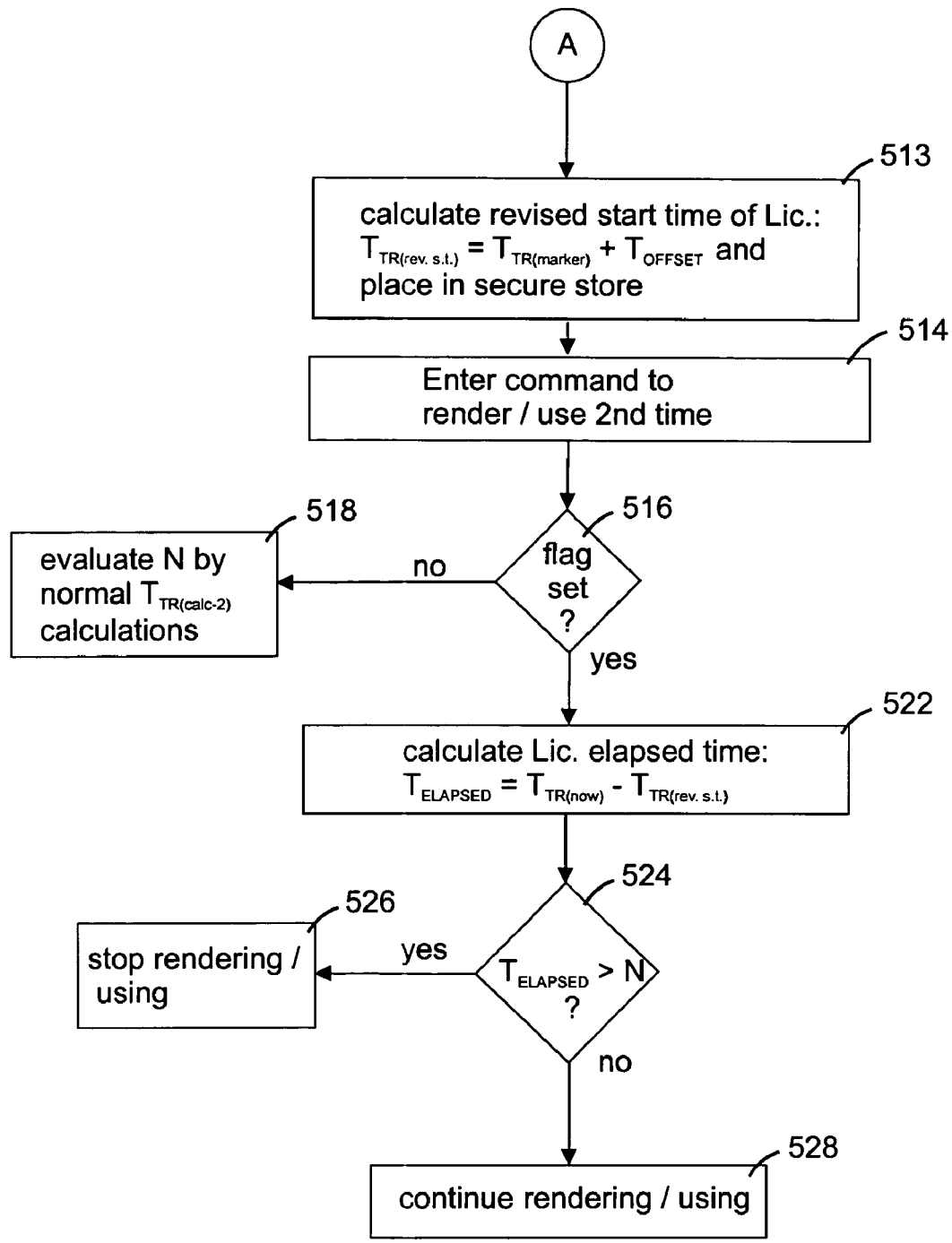

FIGS. 6a and 6b show a simplified process diagram for controlling the use of content where its use is allowed for a certain number of hours or other time period (N) that starts at a point in time when the content is first used. In step 502, a client is in communication with a trusted authority and obtains a verified, trusted time value from the trusted authority during a first communication session. The client securely stores this verified trusted time ($T_O$) in one or more secure stores, along with a system counter value ($C_O$) that corresponds to a point in time corresponding to $T_O$. The client later disconnects from (or otherwise ceases communications with) the trusted authority. Step 504.

While disconnected from the trusted authority, the client commences rendering or otherwise using protected content on a first occasion. Step 505. At about this time of commencement, the client calculates and securely stores a calculated trusted start time "marker" value ($T_{TR(marker)}$) in the same or another secure store. Step 506. This is calculated according to the previously-described algorithm, $T_{TR(marker)} = T_O + (C_{C1} - C_O)$ [or $T_{TR(marker)} = T_O + C_{C1} + (C_{MAX} - C_O)$ when $C_{C1}$ is less than $C_O$], where $C_{C1}$ is the system counter value as recorded at the time of calculating $T_{TR(marker)}$. At some later point in time, the client re-establishes communication with the trusted authority and obtains an updated, verified trusted time value ($T_{O(updated)}$) from the trusted authority during a second communication session. This value is placed in the same or another secure store along with an updated system counter value ($C_{O(updated)}$) that corresponds to the point in time when $T_{O(updated)}$ is received. Step 508.

In step 510 a time offset value ($T_{OFFSET}$) is calculated by taking a difference between the updated, verified trusted time value ($T_{O(updated)}$) and a calculated trusted time value ($T_{TR(calc-1)}$) that was calculated at the time that $T_{O(updated)}$ was obtained from the trusted authority. $T_{TR(calc-1)}$ is calculated using the algorithm $T_{TR(calc-1)} = T_O + (C_{C2} - C_O)$ [or using the algorithm $T_{TR(calc-1)} = T_O + C_{C2} + (C_{MAX} - C_O)$ if $C_{C2}$ is less than $C_O$], where $C_{C2}$ is the system counter value as recorded at the time of calculating $T_{TR(calc-1)}$. Next, the system securely stores this offset time value ($T_{OFFSET}$) in the same or another secure store and sets a flag indicating that the client now has a time offset value. Step 512. Finally, a revised, calculated trusted start time ($T_{TR(rev.s.t.)}$) of the license is calculated according to the algorithm $T_{TR(rev.s.t.)} = T_{TR(marker)} + T_{OFFSET}$, where $T_{TR(marker)}$ is the value calculated in step 506 and $T_{OFFSET}$ is the value calculated in step 510. This $T_{TR(rev.s.t.)}$ value is then placed in the same or another secure store. Step 513.

At some later time, a command is entered for the application to commence rendering or using the same content on a second occasion. Step 514. In response to this command and at about the time that the system makes a decision to attempt use of the content, a determination is made whether the flag has been set. Step 516. If the flag was not set, then the license time limit evaluation is conducted using the previously-described, trusted time calculation algorithm, i.e. $T_{TR(calc-2)} = T_O + (C_{C3} - C_O)$ [or $T_{TR(calc-2)} = T_O + C_{C3} + (C_{MAX} - C_O)$ if $C_{C3}$ is less than $C_O$], where $C_{C3}$ is the system counter value as recorded at the time of calculating $T_{TR(calc-2)}$. Step 518.

On the other hand if the flag has been set, the elapsed license time ($T_{ELAPSED}$) is calculated according to the algorithm $T_{ELAPSED} = T_{TR(now)} - T_{TR(rev.s.t.)}$. Step 522. $T_{ELAPSED}$ is the amount of time that has elapsed since the start time when the content was first used. $T_{TR(now)}$ is the calculated trusted time as calculated at the present point in time according to the algorithm, $T_{TR(now)} = T_{O(updated)} + (C_{C4} - C_{O(updated)})$ [or $T_{TR(now)} = T_{O(updated)} + C_{C4} + (C_{MAX} - C_{O(updated)})$ if $C_{C4}$ is less than $C_{O(updated)}$], where $C_{C4}$ is the counter value as recorded at the time of calculating $T_{TR(now)}$. $T_{TR(rev.s.t.)}$ is the revised license start time as previously calculated. Next a determination is made whether the license elapsed time ($T_{ELAPSED}$) exceeds the allowable usage time, N. Step 524. If the allowable usage time (N) has been exceeded, then rendering or use of the content is no longer permitted. Step 526. If the allowable license time (N) has not been exceeded, then the application may continue rendering or using the content. Step 528.

According to yet another embodiment of the invention, an application is permitted to render or otherwise use content a plurality of times, so long as there has been synchronization with a trusted authority within a required time period. An application session start time (SST) is securely stored in one or more secure stores. When the client is in communication with a trusted authority, a trusted time value is received from the trusted authority and also securely stored in the same or another secure store, along with a system counter value that corresponds with the trusted time value point in time. Also, a last trusted connection time value (LTC) corresponding to the point in time when the client most recently communicated with the trusted authority is securely stored.

When a user desires to render or use protected content, a calculated trusted time value is generated and the LTC value is retrieved from a secure store. The difference between these two time values represents the amount of time that has elapsed since there has been a communication with the trusted authority. If this amount of elapsed time is less than a predetermined time period set forth in a content license, then use of the content is permitted.

Figure 7A:
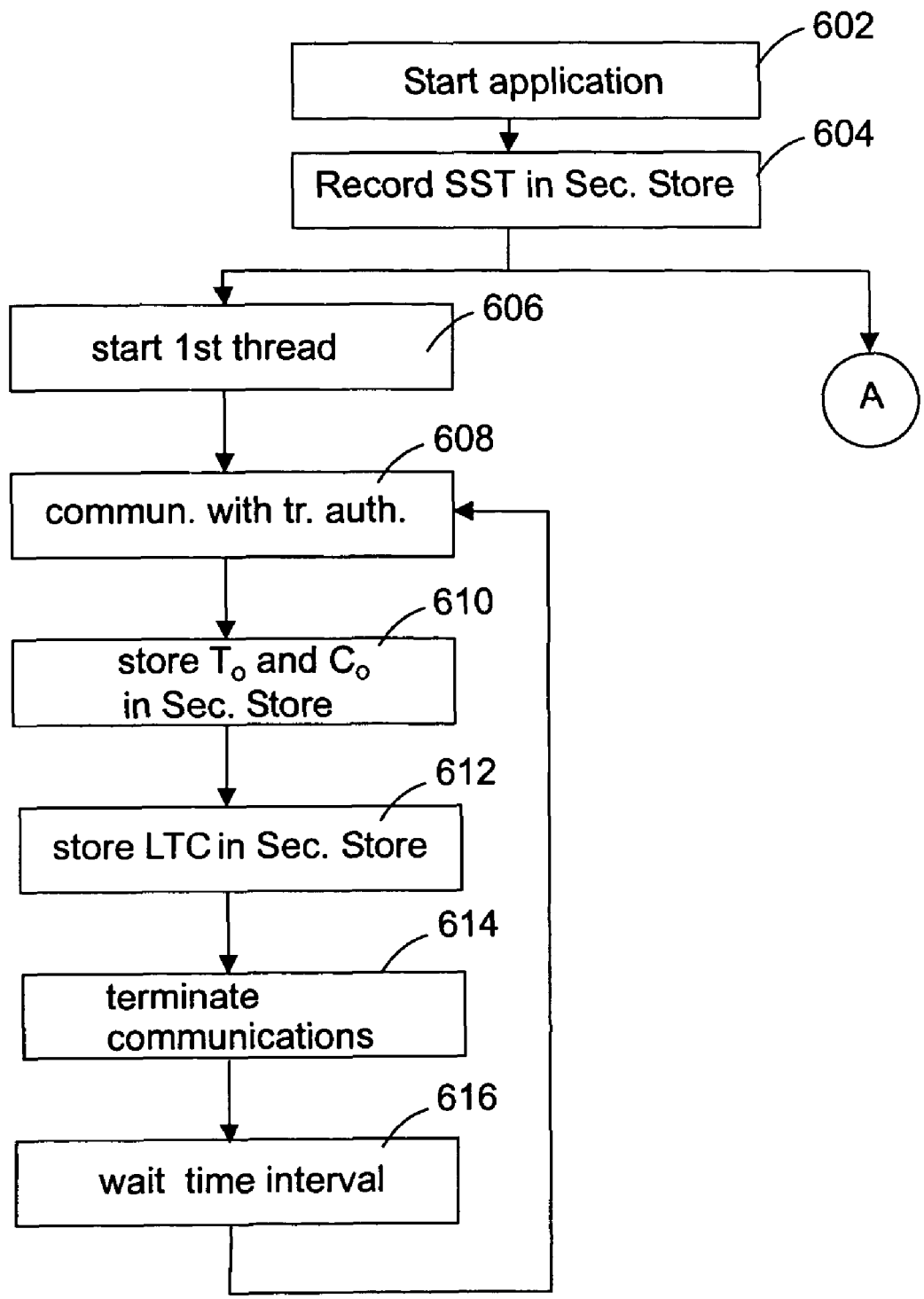
FIGS. 7a and 7b are a simplified flow diagram of yet another process for monitoring time according to another embodiment of the invention.
Figure 7B:
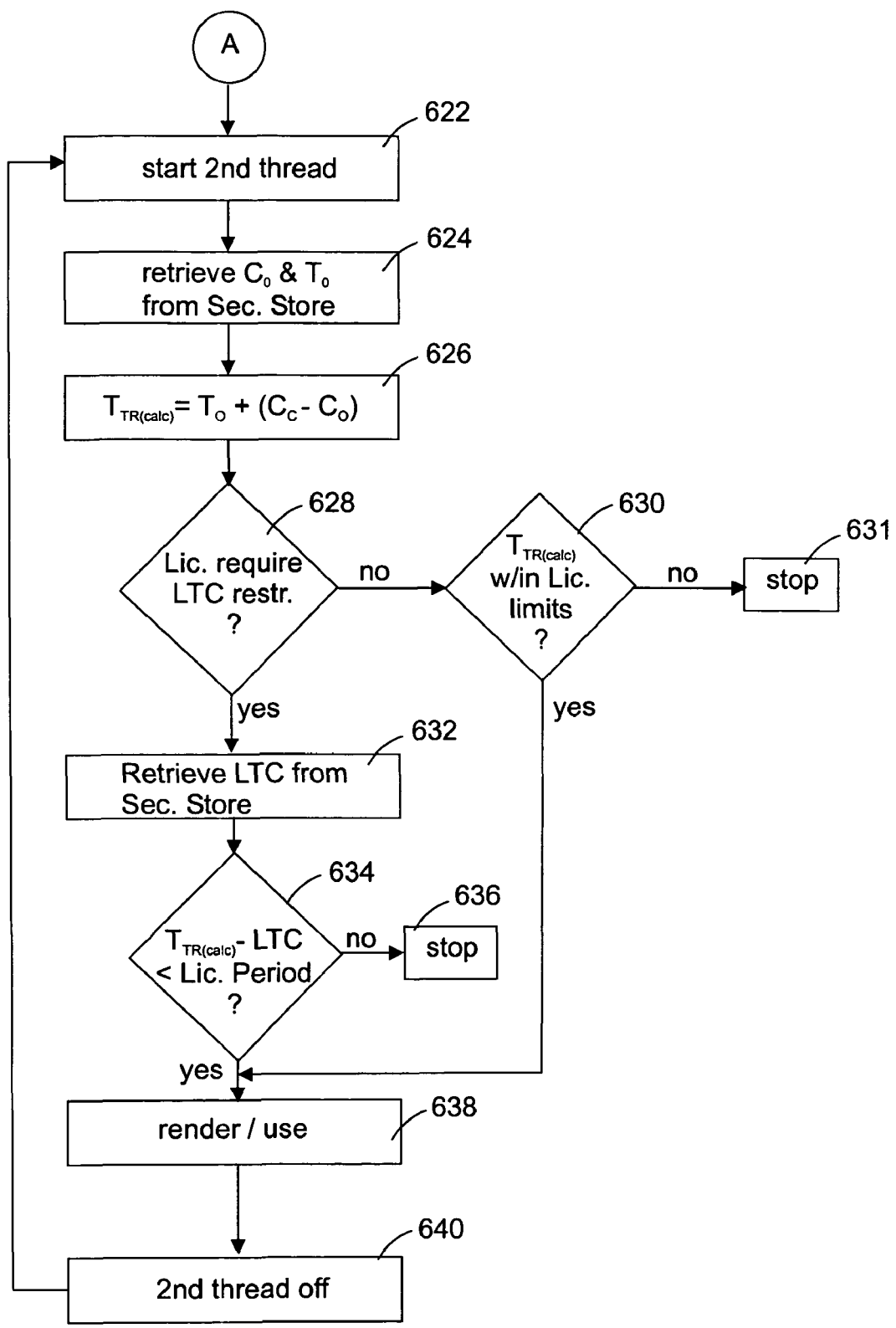

FIGS. 7a and 7b are a simplified process flow diagram showing this synchronization requirement. In step 602, an application adapted to use protected content is started, or at least a sub-system of such an application is initialized. A session start time (SST) corresponding to this point in time is securely stored in one or more secure stores. Step 604. At this point, two threads within the application run simultaneously. In an alternative embodiment, however, rather than two threads running within the same application, separate applications may be running.

In step 606, the first thread starts whereupon it establishes communication with a trusted time authority. Step 608. The first thread then causes the client to obtain a verified trusted time value ($T_O$) from the trusted authority, and securely places this value in the one or more secure stores along with an operating system counter value ($C_O$) corresponding to a point in time when $T_O$ was obtained. Step 610. Additionally a last trusted connection time value (LTC) corresponding to the most recent point in time that the client established communications with the trusted authority is securely stored in the same or another secure store. Step 612. In some embodiments of the invention, LTC will be identical or nearly identical to $T_O$. Next, communication between the client and the trusted authority is terminated. Step 614. After waiting a predetermined time interval (step 616), control returns to step 608 where the first thread causes the client to again communicate with the trusted authority. This process is then repeated whereby updated values for $T_O$, $C_O$, and LTC are obtained and securely stored at periodic, predetermined time intervals.

While the first thread is executing, the second thread is started (step 622) when it is desired to render or otherwise use the protected content. The $C_O$ and $T_O$ values are retrieved from the one or more secure stores (step 624), and a current trusted time value is calculated according to the previously-described algorithm, $T_{TR(calc)} = T_O + (C_C - C_O)$ [or according to $T_{TR(calc)} = T_O + C_C + (C_{MAX} - C_O)$, where $C_C$ is less than $C_O$], where $C_C$ is the current system counter value as recorded at the time of calculating $T_{TR(calc)}$. (Step 626) Next, the license is evaluated to determine whether there are temporal content use restrictions that depend upon a LTC value. Step 628. If not, then a determination is made whether the calculated trusted time value ($T_{TR(calc)}$), as determined in step 626, is within the rules of the content license. Step 630. If not, then the process stops and use of the content is not permitted. Step 631. On the other hand, if the calculated trusted time value is within the rules of the content license, then control jumps to step 638 and use of the content is permitted.

Returning to step 628, if on the other hand the license has temporal content use restrictions that depend upon a LTC value, then the LTC value is retrieved from the one or more secure stores. Step 632. Next, a difference between the $T_{TR(calc)}$ value and the LTC value is compared with a predetermined time period set forth in the license. Step 634. The difference between $T_{TR(calc)}$ and LTC represents the amount of time that has elapsed since there has been a communication with the trusted authority. If this amount of elapsed time is greater than the license predetermined time period, then use of the content is not permitted. Step 636. On the other hand, if this amount of elapsed time is less than the license predetermined time period, then use of the content is permitted. Step 638. Thus for example, a license may have a predetermined time period requirement of 20 minutes, during which time the client should communicate with the trusted authority and obtain updated values for $T_O$, $C_O$, and LTC. If the value for $T_{TR(calc)}$ minus LTC is less than the 20 minute time period, then it can be inferred that there has been a synchronization with the trusted authority within the time period allowed by the license, and use of the content is permitted. Otherwise, content use will not be permitted. Also, the license predetermined time period used in step 634 is a value that is greater than the predetermined wait time interval of step 616. By using such a greater value, the first thread will obtain updated $T_O$, $C_O$, and LTC values during a time period that falls within license requirements.

After use of the content is over, the second thread is turned off. Step 640. Control returns to step 622 and the above-described process is repeated when it is desired to again use protected content.

Thus disclosed are methods and systems for monitoring time so that the use of protected content can be controlled. Rather than relying only upon a client's system clock, which may be susceptible to tampering by a user, embodiments of the invention receive a correct, "trusted" time value from a trusted authority external to the client device. When the client is no longer in communication with the trusted authority, the previously-received trusted time value is updated by use of the client's operating system counter so that a calculated trusted time value is derived for content license evaluation purposes.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method of controlling the use of content, the method comprising:
   receiving a first time value from a trusted authority external to a client;
   securely storing the first time value;
   securely storing, using a central processing unit (CPU), a first counter value corresponding to a point in time corresponding to the first time value;
   calculating a time offset value as a function of a difference between a second counter value and the first counter value;
   combining the time offset value with the first time value to obtain a calculated time value; and
   using the calculated time value to control the use of the content.

2. The method of claim 1, wherein receiving the first time value includes receiving the first time value from the trusted authority while the trusted authority is in communication with the client via a network, and wherein combining the time offset value with the first time value includes combining the time offset value with the first time value at a point in time when the client is not in communication with the trusted authority.

3. The method of claim 1, further comprising evaluating a license having temporal rules according to the calculated time value.

4. The method of claim 1, wherein the first and second counter values are generated by a counter adapted to provide a plurality of counter values between a minimum counter value and a maximum counter value, and to generate the minimum counter value following the maximum counter value,
   wherein the time offset value is a function of the second counter value minus the first counter value if the first counter value is less than the second counter value, and
   wherein the time offset value is a function of the second counter value plus the maximum counter value minus the first counter value if the first counter value is greater than the second counter value.

5. The method of claim 4, wherein receiving the first time value includes receiving the first time value from the trusted authority while the trusted authority is in communication with the client via a network, and wherein combining the time offset value with the first time value includes combining the time offset value with the first time value at a point in time when the client is not in communication with the trusted authority.

6. The method of claim 4, further comprising evaluating a license having temporal rules according to the calculated time value.

7. An article of manufacture for controlling the use of content and for use by a device having a processing unit, the device being adapted to receive data from a trusted authority external to the device, the article of manufacture comprising:
at least one non-transitory, tangible computer usable media including at least one computer program embedded therein, the at least one computer program being adapted to cause the device to perform:
receiving a first time value from the trusted authority;
securely storing the first time value;
securely storing a first counter value corresponding to a point in time corresponding to the first time value;
calculating a time offset value as a function of a difference between a second counter value and the first counter value;
combining the time offset value with the first time value to obtain a calculated time value; and
using the calculated time value to control the use of the content.

8. A system for controlling the use of content and adapted to receive data from a trusted authority external to the system, the system comprising:
a device having a processing unit capable of executing software routines, and programming logic executed by the processing unit, wherein the programming logic is operable with the processing unit to control the use of the content by performing steps comprising:
receiving a first time value from the trusted authority;
securely storing the first time value;
securely storing a first counter value corresponding to a point in time corresponding to the first time value;
calculating a time offset value as a function of a difference between a second counter value and the first counter value;
combining the time offset value with the first time value to obtain a calculated time value; and
using the calculated time value to control the use of the content.

9. A method of monitoring time, comprising:
receiving a first time value from a trusted authority external to a client;
securely storing the first time value;
securely storing, using a central processing unit (CPU), a first counter value corresponding to a point in time corresponding to the first time value;
combining a time offset value with the first time value to obtain a calculated time value, wherein the time offset value is a function of a difference between a second counter value and the first counter value;
selecting the larger of one of the calculated time value and a system clock time value; and
evaluating a license having temporal rules according to the selected larger one of the calculated time value and the system clock time value.

10. The method of claim 9 further comprising:
securely storing a second time value corresponding to a point in time when the client was most recently in communication with the trusted authority; and
securely storing a third time value corresponding to a point in time when at least a subsystem of an application was most recently initialized, the application being adapted for using content.

11. The method of claim 9 wherein receiving the first time value includes receiving the first time value from the trusted authority while the trusted authority is in communication with the client via a network, and wherein combining the time offset value with the first time value includes combining the time offset value with the first time value at a point in time when the client is not in communication with the trusted authority.

12. The method of claim 9 wherein the first and second counter values are generated by a counter adapted to provide a plurality of counter values between a minimum counter value and a maximum counter value, and to generate the minimum counter value following the maximum counter value, and
wherein the time offset value is a function of the second counter value minus the first counter value if the first counter value is less than the second counter value, and
wherein the time offset value is a function of the second counter value plus the maximum counter value minus the first counter value if the first counter value is greater than the second counter value.

13. The method of claim 9 further comprising securely storing a second time value,
wherein the second time value corresponds to a point in time when the client was most recently in communication with the trusted authority, and
wherein evaluating the license having temporal rules includes evaluating the license having temporal rules if the second time value corresponds to a point in time that has occurred within a predetermined time period.

14. A method of monitoring time, comprising:
receiving a first time value from a trusted authority external to a client;
securely storing the first time value;
securely storing, using a central processing unit (CPU), a first counter value corresponding to a point in time corresponding to the first time value; and
combining a time offset value with the first time value to obtain a calculated time value if a second time value is greater than a third time value,
wherein the second time value corresponds to a point in time when the client was most recently in communication with the trusted authority,
wherein the third time value corresponds to a point in time when at least a subsystem of an application was most recently initialized, the application being adapted for using content, and
wherein the time offset value is a function of a difference between a second counter value and the first counter value.

15. The method of claim 14 further comprising securely storing the second and third time values.

16. The method of claim 14 wherein combining the time offset value with the first time value includes combining the time offset value with the first time value if the second time value corresponds to a point in time that has occurred within a predetermined time period.

17. The method of claim 14, wherein receiving the first time value includes receiving the first time value from the trusted authority while the trusted authority is in communication with the client via a network, and wherein combining the time offset value with the first time value includes combining the time offset value with the first time value at a point in time when the client is not in communication with the trusted authority.

18. The method of claim 14 further comprising evaluating a license having temporal rules according to the calculated time value.

19. The method of claim 14 wherein the first and second counter values are generated by a counter adapted to provide a plurality of counter values between a minimum counter value and a maximum counter value, and to generate the minimum counter value following the maximum counter value, and wherein the time offset value is a function of the second counter value minus the first counter value if the first counter value is less than the second counter value, and wherein the time offset value is a function of the second counter value plus the maximum counter value minus the first counter value if the first counter value is greater than the second counter value.

20. An article of manufacture for monitoring time and for use by a device having a processing unit, the device being adapted for communication with a trusted authority external to the device, the article of manufacture comprising:

at least one non-transitory, tangible computer usable media including at least one computer program embedded therein, the at least one computer program having a subsystem and being adapted to cause the device to perform:

receiving a first time value from the trusted authority;

securely storing the first time value;

securely storing a first counter value corresponding to a point in time corresponding to the first time value; and combining a time offset value with the first time value to obtain a calculated time value if a second time value is greater than a third time value, wherein the second time value corresponds to a point in time when the device was most recently in communication with the trusted authority, wherein the third time value corresponds to a point in time when at least the subsystem of the at least one computer program was most recently initialized, and wherein the time offset value is a function of a difference between a second counter value and the first counter value.

21. A system for monitoring time and adapted for communication with a trusted authority external to the system, the system comprising:

a device having a processing unit capable of executing software routines, and programming logic executed by the processing unit, wherein the programming logic is operable with the processing unit to control the use of the content by performing steps comprising:

receiving a first time value from the trusted authority;

securely storing the first time value;

securely storing a first counter value corresponding to a point in time corresponding to the first time value; and combining a time offset value with the first time value to obtain a calculated time value if a second time value is greater than a third time value, wherein the second time value corresponds to a point in time when the device was most recently in communication with the trusted authority, wherein the third time value corresponds to a point in time when at least a portion of the programming logic was most recently initialized, and wherein the time offset value is a function of a difference between a second counter value and the first counter value.

* * * * *